Feb. 3, 1970     E. L. STIERS     3,493,329
METHOD OF MAKING SODIUM CARBONATE
Filed March 30, 1966     7 Sheets-Sheet 1

Inventor
E. L. STIERS
By Holcombe, Wetherill & Brisebois
Attorneys

Feb. 3, 1970   E. L. STIERS   3,493,329
METHOD OF MAKING SODIUM CARBONATE
Filed March 30, 1966   7 Sheets-Sheet 2

Inventor
E. L. STIERS
BY
Holcombe, Wetherill & Brisebois
Attorneys

Feb. 3, 1970  E. L. STIERS  3,493,329
METHOD OF MAKING SODIUM CARBONATE
Filed March 30, 1966  7 Sheets-Sheet 3

Inventor
E. L. STIERS
BY Holcombe, Wetherill & Brisebois
Attorneys

Feb. 3, 1970     E. L. STIERS     3,493,329
METHOD OF MAKING SODIUM CARBONATE
Filed March 30, 1966     7 Sheets-Sheet 5

Inventor
E. L. STIERS
By Holcombe, Wetheill & Brisebois
Attorneys

Feb. 3, 1970    E. L. STIERS    3,493,329
METHOD OF MAKING SODIUM CARBONATE
Filed March 30, 1966    7 Sheets-Sheet 6

FIG. 9

Inventor
E. L. STIERS
By Holcombe, Wetheigh + Briebois
Attorneys

Feb. 3, 1970      E. L. STIERS      3,493,329
METHOD OF MAKING SODIUM CARBONATE
Filed March 30, 1966      7 Sheets-Sheet 7

Inventor
E. L. STIERS

United States Patent Office 3,493,329
Patented Feb. 3, 1970

3,493,329
METHOD OF MAKING SODIUM CARBONATE
Edouard Louis Stiers, 46 Rue de la Vallee,
Brussels, Belgium
Filed Mar. 30, 1966, Ser. No. 538,833
Int. Cl. C01d 7/00, 11/00
U.S. Cl. 23—63                        17 Claims

ABSTRACT OF THE DISCLOSURE

The preparation of $NaHCO_3$ and HCl in which $Na_2SO_4$ and $NaHSO_4$ are used in a series of reactions culminating in the following equation:

$$CO_2 + H_2O + NaCl \rightarrow NaHCO_3 + HCl$$

The $NaHCO_3$ may be converted to $Na_2CO_3$ by calcining.

Sodium carbonate is a raw material commonly used in making caustic soda by a process comprising the step of treating the carbonate with lime.

However, this method of manufacture has, of recent years, encountered considerable competition from newly developed electrolytic processes having as their principal object the production of gaseous chlorine by the electrolysis of sodium chloride. These processes yield large quantities of caustic soda as a by-product. It has even been suggested that some of the excess production of electrolytic caustic soda could be converted into sodium carbonate.

The conventional process for making sodium carbonate is based on the concept of starting with solutions of sodium chloride, in which gaseous ammonia is first dissolved. $CO_2$ is then absorbed. The sodium chloride reacts with the ammonium bicarbonate thus formed to yield sodium bicarbonate, which precipitates, and ammonium chloride, which remains in solution. The sodium bicarbonate is then roasted to yield sodium carbonate, while the ammonia of the ammonium chloride is regenerated by adding a slurry of lime. It will be appreciated that in this process, the chlorine is removed in the degraded form of calcium chloride and that it is also necessary to use substantial quantities of calcareous material to make the slurry of lime.

The object of the present invention is to improve the process by providing one in which no calcareous material is required and in which the chlorine from the sodium chloride used as a raw material is removed in the form of gaseous hydrochloric acid, which may be utilized either as such, after being dissolved in water, or in the form of chlorine, after oxidation by the Deacon process.

It should be noted that the process according to the invention is especially economical in countries where calcareous raw materials are scarce, and that it yields a by-product which is in strong demand, i.e. hydrochloric acid. While the process according to the invention requires the use of sodium chloride in solid form rather than as brine, its profitability would appear to be assured.

The specific object of the present invention is to provide a new method of making sodium carbonate which is characterized by the fact that sodium ions are introduced into a carbonated aqueous ammoniacal solution by dissolving sodium sulfate therein, and that sodium bicarbonate is precipitated by absorption of carbon dioxide gas, thus also yielding ammonium sulfate. The sodium bicarbonate is ultimately roasted to yield the desired sodium carbonate, while the sodium sulfate and ammonia are regenerated from the ammonium sulfate by heating it, and adding sodium chloride, the chlorine of which is removed in the form of hydrochloric gas.

It will be seen that the overall effect of the process according to the invention is to react carbon dioxide with sodium chloride to yield sodium carbonate and hydrochloric acid according to the general formula:

$$CO_2 + H_2O + 2NaCl = Na_2CO_3 + 2HCl$$

This process comprises two steps:

In the first step sodium carbonate is obtained by precipitating sodium bicarbonate from an aqueous solution containing $SO_4^{--}$, $CO_3^{--}$, $Na^+$ and $NH_4^+$ ions.

This reaction takes place in accordance with the following equation:

$$2NH_3 + 2CO_2 + 2H_2O + Na_2SO_4 \rightleftharpoons (NH_4)_2SO_4 + 2NaHCO_3\downarrow$$

The second step is to regenerate the sodium sulfate which has been used in the first step to provide the sodium ions and which has been transformed in the aqueous solution into ammonium sulfate. This regeneration is accomplished in two stages: In a first stage the ammonium sulfate formed in the aqueous solution is precipitated either in the form of pure ammonium sulfate according to the following equation:

$$\underset{\text{(Solid)}}{Na_2SO_4} + \underset{\text{(Dissolved)}}{(NH_4)_2SO_4} \longrightarrow \underset{\text{(dissolved)}}{Na_2SO_4} + \underset{\text{(solid)}}{(NH_4)_2SO_4}\downarrow$$

or in the form of a double salt of ammonium sulfate and sodium sulfate in accordance with the following equation:

$$\underset{\text{(Solid)}}{2Na_2SO_4} + \underset{\text{(dissolved)}}{(NH_4)_2SO_4} + 4H_2O \longrightarrow$$
$$\underset{\text{(dissolved)}}{Na_2SO_4} + \underline{Na_2SO_4(NH_4)_2SO_4 \cdot 4H_2O}\downarrow$$

In a second stage the ammonium sulfate thus obtained is reacted in its solid form, simply by heating it in the presence of sodium sulfate, to produce the following reaction:

$$(NH_4)_2SO_4 + Na_2SO_4 \rightarrow 2NaHSO_4 + 2NH_3\uparrow$$

This reaction makes it possible to recover the ammonia which is needed for the first phase and to obtain sodium acid sulfate which is then reacted, in the form of fused salt, with sodium chloride to obtain regenerated sodium sulfate and release hydrochloric acid, the reaction being as follows:

$$2NaHSO_4 + 2NaCl = 2Na_2SO_4 + 2HCl\uparrow$$

In a preferred method of carrying out the process according to the invention, we therefore have a cycle of aqueous solutions herein after called the "liquid cycle," in which the principal components used are absorbers for ammonia, and absorbers for carbonic gas, and comprising a bicarbonating step in the course of which sodium bicarbonate is precipitated, and a dissolving-crystallizing step in the course of which the ammonium sulfate resulting from the bicarbonating step is precipitated. The latter precipitation is obtained by adding solid sodium sulfate which is dissolved. We also have a cycle of solids which will be called the "solid cycle," in which the principal components used are an ammonia generator which acts by thermal decomposition of the ammonium sulfate and a generator for hydrochloric gas which acts by decomposing sodium chloride in the presence of acid sodium sulfate evolved during the thermal decomposition of the ammonium sulfate.

In order that the invention may be more clearly understood, two methods of carrying it out will now be described. In the first of these methods the double salt is precipitated in the first stage, while in the second pure ammonium sulfate is precipitated in that stage. The description will set forth in detail the parameters of the process, and describe representative equipment with which it may be carried out. This description is given purely by way of example and is illustrated on the accompanying drawings.

In each of diagrams 2-6 a unit distance along the ordinate represents the same gram equivalent value as the same distance along the abscissa.

It will first consider the form of the process according to which ammonium sulfate is precipitated in the form of the double salt.

In the first phase, the immediate object is to obtain sodium bicarbonate, which is roasted to yield sodium carbonate. The sodium bicarbonate is produced during the "liquid cycle." Referring more particularly to FIG. 1, it will be seen that reference numeral 1 indicates a device for injecting a certain quantity of carbon dioxide gas and ammonia into the circuit, while reference numeral 2 indicates the dissolver-crystallizer in which the ammonium sulfate is precipitated by the introduction of sodium sulfate. In the embodiment hereinafter described the ammonium sulfate is precipitated in the form of a double salt having the formula $(Na_2SO_4,(NH_4)_2SO_4,4H_2O)$.

The sodium bicarbonate is precipitated in a bicarbonating tower 3, after additional carbon dioxide gas and ammonia have been introduced into the circulating liquid by means of the apparatus 4. The bicarbonating tower 3 is supplied with carbon dioxide gas under pressure through injection means 68. It should be noted that the aqueous solution which circulates in the circuit shown schematically on FIG. 1 contains the four ions $CO_3^{--}$, $NH_4^+$, $SO_4^{--}$, $Na^+$.

Figure 2:
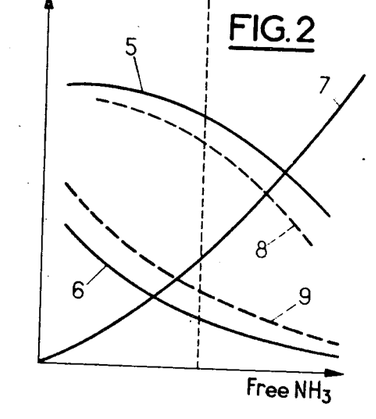
FIG. 2 shows the equilibrium curves at the triple points, giving as a function of the concentration of free ammonia the values of the concentrations of sodium sulfate, ammonium sulfate and carbon dioxide in the dissolver-crystallizer at a given temperature.

FIG. 2 shows the curves which, in this embodiment of the invention, show the concentrations in the circulating liquid at the output of the dissolver-crystallizer 2. The concentration of free ammonia, i.e., the concentration of ammonia which may be released by simple heating, is plotted along the abscissa. The concentration of the sodium sulfate in the liquid at the triple points, i.e., the points at which sodium sulfate coexists with the double salt and bicarbonate of soda, is plotted along the ordinate as curve 5. The concentration of ammonium sulfate at the triple points is plotted as curve 6 along the ordinate, and the concentration of carbon dioxide in the liquid at the same triple points is plotted along the ordinate as curve 7. It will be seen that, for a given concentration of free ammonia, the curves 5-6-7 make it possible to determine the corresponding concentrations of sodium sulfate, ammonium sulfate and $CO_2$ for a given triple point at the outlet of the dissolver-crystallizer 2.

Figure 3:
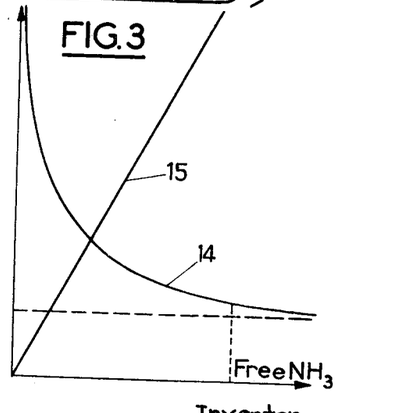
FIG. 3 shows the equilibrium curves giving the values at the base of the bicarbonating tower for the concentrations of carbon dioxide and sodium sulfate as a function of the concentration of free ammonia at a given temperature and at a given partial pressure of $CO_2$.

FIG. 3 shows the curves representing the equilibriums at the base of the bicarbonating tower 3, as a function of the free ammonia content, which is plotted along the abscissa, with the curve 14 giving the sodium sulfate content in the liquid and the curve 15 giving the carbon dioxide content.

The group of parameters which determines the liquid cycle comprises twelve values, namely: the relative percentages of free ammonia, of carbon dioxide gas, of sodium sulfate, and of ammonium sulfate at the outlet of the bicarbonating tower 3 and of the dissolver-crystallizer 2 as well as the volumes circulating at these two points, the division of ammonia between the absorbers 1 and 4, and the division of carbon dioxide gas between the absorber 1 and the apparatus 3 and 4.

These twelve parameters, which define the liquid cycle, are related by five equations of material balance. If, moreover, at the outlet of the dissolver-crystallizer 2, the concentrations are brought to values near those at a triple point, that is to say, at a point at which sodium sulfate, the double salt, and the sodium bicarbonate, coexist, the concentrations at the output of the dissolver-crystallizer are related as shown by the curves shown on FIG. 2. Finally, the precipitation of bicarbonate of soda in the bicarbonating tower requires that the concentration of carbon dioxide gas, sodium sulfate and free ammonia be related as shown on the curves of FIG. 3.

It follows that the twelve parameters which determine the system are related in a total of ten ways and that the liquid cycle is therefore completely determined by any two of these parameters.

During the following description of the liquid cycle the concentration of ammonia at the output of carbonating-tower and the division of the carbon dioxide gas absorbed between the absorber 1, on the one hand and the devices 3 and 4 on the other hand, will be considered as "given."

It is clear that the liquid cycle could be determined without imposing as an essential condition that the concentrations must be near a triple point at the outlet of the dissolver-crystallizer 2. In this case an equilibrium would nevertheless subsist between the different concentrations which would make it possible to precipitate a double salt in the dissolver-crystallizer 2. Under such conditions the twelve parameters which define the liquid cycle would be related in only eight ways and the system would be tetra-variant. However, operation near the triple point at the output of the dissolver-crystallizer makes it possible, as will be hereinafter set forth, to decrease the volume of circulating liquid for a given yield of sodium bicarbonate. This suggestion entails two supplemental relationships between the parameters of the liquid cycle and thus reduces to two the possible variations of the process.

It should, however, be noted that, in order to avoid contamination of the said double salt by the other salts which can coexist with it in the dissolver-crystallizer at the triple point selected for operation, it is preferable to maintain the concentrations of sodium sulfate and ammonium sulfate at values slightly different from those given by the curves 5 and 6 of FIG. 2. It follows that curves such as 8 and 9, which are the equivalents of 5 and 6 for a temperature slightly higher than that at which the process is to be operated, are substituted for curves 5 and 6.

If, beginning with the two values selected for the concentration of free ammonia at the outlet of the carbonating tower and for the division of the carbon dioxide gas between the absorbers 1 and (4+3), the group of parameters defining the liquid cycle is determined, it is also desirable to check that the contemplated operation of the bicarbonating tower will be satisfactory.

Figure 4:
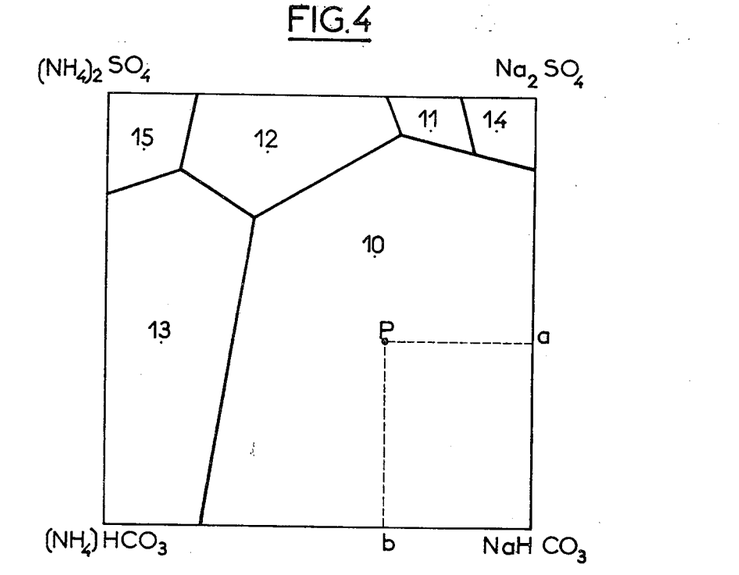
FIG. 4 is a precipitation diagram for the bicarbonating tower.

To this effect is established the conventional square diagram in connection with the four salts having the relation as follows:

Said diagram is shown on FIG. 4. A point P of said diagram is defined by coordinate $a$ and $b$. Since the length of the side of the square is equal to 1, $a$ represents the ratio of cations ($NH_4^+$) of total of cations $b$ represents the ratio of anions $SO_4^{--}$ with the total of anions $[(SO_4)^{--}+(CO_3)^{--}]$.

The diagram of FIG. 4 defines in the plane, for the considered pressure and temperature, six areas, each of which corresponding to the precipitation of a salt:

The zone 10 corresponds to the precipitation of sodium bicarbonate;

The zone 11 corresponds to the precipitation of sodium sulfate;

The zone 12 corresponds to the precipitation of the double salt $[Na_2SO_4,(NH_4)_2SO_4,4H_2O]$;

The zone 13 corresponds to the precipitation of ammonium bicarbonate;

The zone 14 corresponding to the precipitation of $Na_2SO_4 10H_2O$;

The zone 15 corresponding to the precipitation of $(NH_4)_2SO_4$.

After having determined the twelve parameters of the liquid cycle, a check should be made to ensure that point at which the bicarbonating tower operates may be found within zone 10 of FIG. 4, and sufficiently spaced from the perimeter of this zone to provide an adequate margin of safety, as exemplified by the area within the broken lines.

As has already been indicated, it is convenient to begin the calculation of the parameters by starting with the concentration of free ammonia at the outlet of the bicarbonating tower.

Figure 1:
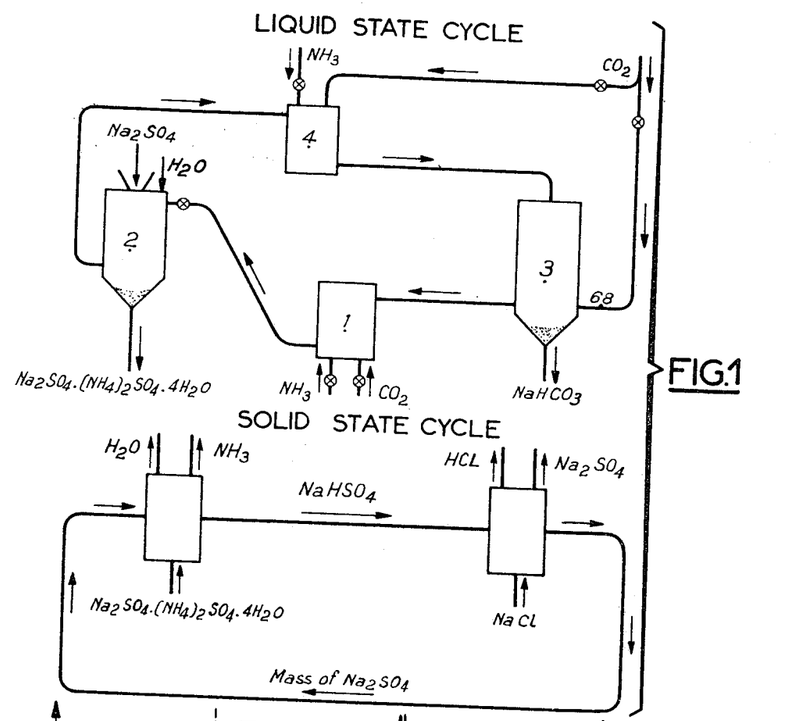
FIG. 1 is a diagram showing the liquid and solid cycle.

In adopting this choice, it is useful to select conditions such that the volume of liquid circulating for a given precipitation of bicarbonate will be reduced to a minimum. It should first be noted that this volume is, to a first approximation, constant throughout the circuit, since the operations carried out involve only the admission and discharge of solids and the absorption and desorption of gas. Therefore, by referring to the material balance equation for the sodium sulfate, it will be found that the volume circulating is inversely proportional to the difference in concentration at the inlet and outlet sides of the dissolver-crystallizer 2.

In order to obtain a minimum circulating volume it is convenient to select a maximum difference in concentration of sodium sulfate. However, FIG. 3 shows that the concentration in sodium sulfate upstream of the dissolver-crystallizer has an asymptotic minimum value. It is consequently desirable to select a concentration in sodium sulfate at the outlet of the bicarbonating tower which is as close as possible to the ordinate of the asymptote shown on FIG. 3, that is to say, to select a value for the concentration in free ammonia at the output of the bicarbonating tower as large as possible. Moreover, an examination of FIG. 2 and the curve 5 of this figure shows that if a high concentration in sodium sulfate at the outlet of the dissolver-crystallizer is desired, the percentage of free ammonia downstream of this dissolver should be kept as low as possible.

It should be noted, however, that from a practical point of view, it is difficult to envisage the desorption of ammonia between the outlet of the bicarbonating tower and the entrance to the dissolver-crystallizer, so that the free ammonia content at the outlet from the dissolver-crystallizer must be equal to or greater than the free ammonia content at the outlet from the bicarbonating tower.

Figure 5:
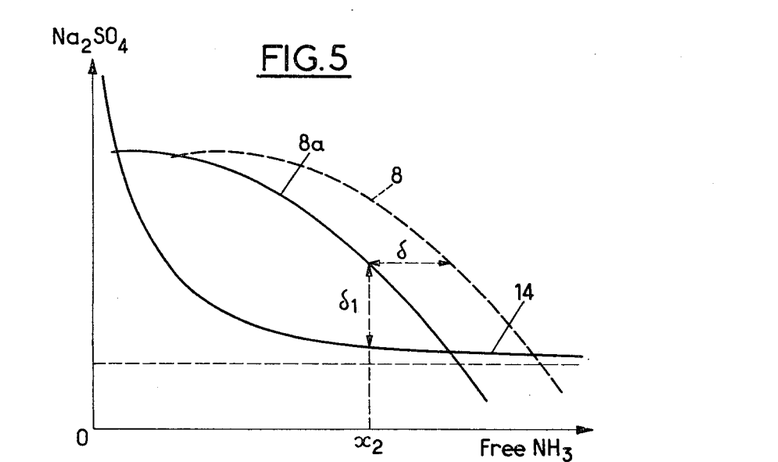
FIG. 5 is a diagram for determining the maximum difference between the concentration of sodium sulfate at the outlet of the bicarbonating tower and at the outlet of the dissolver-crystallizer.

In order to exactly determine the conditions under which a minimum volume in circulation is obtained the first step is to prepare a graph of the type shown on FIG. 5. On this graph the free ammonia content is plotted along the abscissa and the sodium sulfate content along the ordinate. The graph 5 represents a reproduction of both the curve 8 of FIG. 2 and the curve 14 of FIG. 3. If $X_1$ is the free ammonia content at the outlet of the dissolver-crystallizer and $X_2$ the content thereof at the outlet of the bicarbonating tower, a value $\delta$ may be calculated such that $\delta = X_1 - X_2$. It is then possible to derive, for a predetermined value of $\delta$, a curve $8a$, derived by translating the curve 8 by a factor $\delta$, parallel to the abscissa. The curve $8a$ gives the sodium sulfate content at the outlet of the dissolver-crystallizer as a function of the free ammonia content at the outlet of the bicarbonating tower. Thus for each value $X_2$ it is possible to obtain graphically on a vertical between the curves $8a$ and 14 the value of the change in the concentration of sodium sulfate between the outlet of the bicarbonating tower and the outlet of the dissolver-crystallizer. This difference will be called $\delta_1$.

Figure 6:
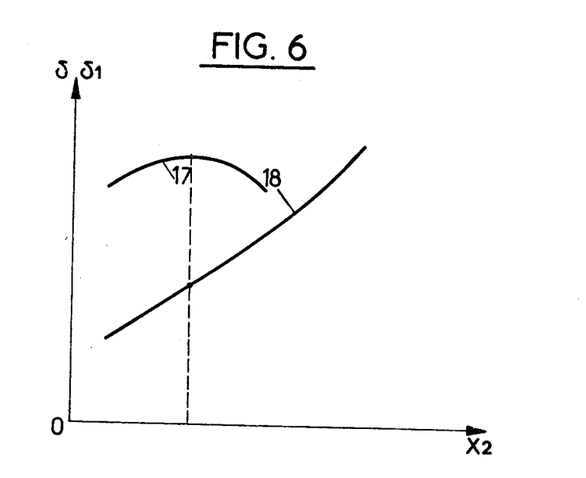
FIG. 6 is a graph showing how the minimum volume of liquid circulating in the liquid cycle may be determined.

If a fixed value is now selected for the second starting value used to determine all the parameters of the liquid cycle, that is to say the allocation of the carbon dioxide gas between the different points at which it is introduced into the apparatus, we have now determined at the same time the value of the concentration of carbon dioxide gas at the outlet of the dissolver-crystallizer 2. If, in order to use the minimum volume of liquid possible, we operate near a triple point, at the outlet from the dissolver-crystallizer, as has already been explained, the fact that we know the concentration of carbon dioxide gas makes it possible to calculate the concentration of free ammonia by using the curve 7 of FIG. 2. Under these conditions, for each value of $X_2$, there is a corresponding value of $\delta$. The curve 18 of FIG. 6 represents the variations of $\delta$ as a function of $X_2$ to satisfy the condition previously mentioned, that is to say, to operate near a triple point at the outlet of the dissolver crystallizer. For each group of value of $\delta$ and $X_2$, a graph similar to the one of FIG. 5 can be draft and gives the value of $\delta_1$. The curve 17 represents the variations of the values of $\delta_1$ so determined as a function of $X_2$. It has a maximum the coordinates of which correspond to the values of $X_1$ and $X_2$ which make it possible to operate the installation with a volume of liquid in circulation which is the minimum possible for the selected distribution of carbon dioxide gas, taking into account the margin of safety provided by the choice of the curve 8.

It is clear that the choice as to the ammonia content which has just been described is not essential to permit the invention to be carried out, but is made simply to determine the parameters of a liquid cycle utilizing a minimum volume of circulating liquid and consequently requiring only the smallest and least expensive apparatus.

A first alternative embodiment for the apparatus shown in FIG. 1 is one in which the absorber 1 absorbs only ammonia, that is to say one in which no carbon dioxide is introduced between the outlet from the bicarbonating tower and the inlet to the dissolver-crystallizer. It should be noted that in this embodiment, as will be hereinafter explained, the carbon dioxide content of the circulating liquid increases, even though the absorber 1 does not introduce any carbon dioxide gas, since the apparatus reintroduces, preferably at this point in the circuit, the carbonate powders picked up by the powder separator of the bicarbonate roaster, and the fraction of bicarbonate which is redissolved by washing in the liquid which circulates through the bicarbonate filter at the outlet of the bicarbonating tower.

Another method of carrying out the liquid cycle comprises the step of, instead of absorbing a certain quantity of carbon dioxide in the circulating liquid in the apparatus 1 of FIG. 1, desorbing said gas instead. This desorption may be obtained merely by heating, preferably under pressure, and makes it possible to obtain very pure carbon dioxide which may then be used for injection at 68 into the bicarbonating tower and to thus increase the percentage of $CO_2$ in the gas under pressure which serves to carbonate the liquid passing through the carbonating tower. It is admitted that these gases may be combustion gases having a low $CO_2$ content, so that the pressure in the bicarbonating tower must be increased to compensate for this deficiency. This alternative has the advantage of making it possible to use for the bicarbonating tower the same apparatus that is already in service in plants now used to manufacture sodium carbonate from chloridized solutions.

Figure 7:
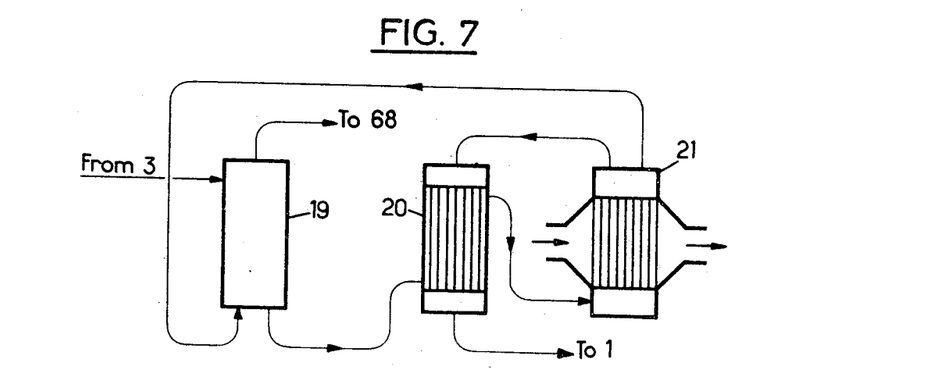
FIG. 7 shows a device for desorbing carbon dioxide gas between the bicarbonating tower and the dissolver-crystallizer.

This alternative process may be carried out by using a device of the type shown in FIG. 7. In this figure the liquid leaving the bocarbonating tower 3 is introduced into the top of a washing tower 19 and then heated first in a liquid heat exchanger 20 and then in a gas heat exchanger 21. The hot liquid of the exchanger 20 is the one leaving the exchanger 21, in which the $CO_2$ has been desorbed therefrom. This liquid is then routed to the dissolver-crystallizer 2, while the distilled $CO_2$ is washed in a countercurrent process in the washing tower 19 and routed to the injection means 68 of the bicarbonating tower 3.

To complete the description of the liquid circuit, it should be noted that the bicarbonate precipitated in the bicarbonating tower is filtered and then routed to a roaster before being transformed into carbonate, said transformation being accompanied by the release of gas having a high $CO_2$ content. This gas, after passing through a washing tower analagous to the tower 19, is used to supply the injection means 68 in the bicarbonating tower 3.

The apparatus for carrying out the solid cycle of the process according to the invention comprises two principal components—a generator for ammonia by means of which the ammonia introduced into the liquid circuit by the absorbers 1 and 4 is recovered, and a generator for generating hydrochloric acid, by means of which the sodium sulfate introduced into the liquid circuit in the dissolver-crystallizer 2 is recovered.

The ammonia generator decomposes by the application of heat the double salt precipitated in the dissolver-crystallizer 2 within a large mass of sodium sulfate. The reaction must be carried out at a temperature high enough to be quick and complete, but too low to dissociate the ammonia. A temperature of about 400° C. is suitable. The reaction takes place most satisfactorily when the calories are very homogenously distributed through the mass of sodium sulfate and the double salt is well mixed into the mass. When the reaction is completed, the ammonia is released and a certain amount of molten sodium acid sulfate impregnates the mass of sodium sulfate.

The ammonia may be generated in any of a number of ways: The chamber which holds the malaxated mixture of the solids to be reacted may be heated, in which case the combustion gases used to heat it are not mixed with the ammonia and water vapor which are released within the chamber. The mass of solids may also be heated by direct contact with the furnace gas, and in this case the apparatus yields a gaseous mixture containing $CO_2$, $NH_3$, $H_2O$ and inert gases. It is also possible to heat only the sodium sulfate and not the mixture of sodium sulfate and the double salt, which of course presupposes that the large mass of the sodium sulfate is initially heated to a temperature such as to bring the mixture as a whole to the selected temperature, that is to say, to the preferred temperature for the reaction.

In another embodiment, it is possible to dehydrate the double salt before it is mixed with the sodium sulfate so as to furnish fewer calories to the ammonia generator.

From a technological point of view, it is clear that the ammonia generator must have an inner lining of an anticorrosive refractory material, and that the mixture may be malaxated by means of a mixing screw or paddle, which must also be made of a corrosion resistant material. Finally the sodium sulfate may be heated in a fluidized bed.

The hydrochloric acid generator operates by treating the sodium acid sulfate which is obtained in the ammonia generator and which impregnates the heated mass of sodium sulfate, with powdered sodium chloride in a quantity molecularly equivalent to that of the sodium acid sulfate formed in the ammonia generator. This device is essentially similar to the ammonia generator and it may be heated directly or indirectly by the furnace gas. It is supplied from the ammonia generator with a mass of sodium sulfate impregnated with sodium acid sulfate by any appropriate means, and in particular by means of a conveyor screw which maintains the necessary seal between the two generators. The calories of the endothermic reaction which regenerates the sodium sulfate are derived, in the embodiment of FIG. 8, from the heat stored in the mass of sodium sulfate being utilized in the process.

In a representative process utilizing in their simplest form the liquid and solid cycles which have just been described a fraction of the total of 34 kg. of $NH_3$ is introduced in the absorber 1 (FIG. 1), and the solution is then led to the dissolver-crystallizer 2, where 284 kg. of $NA_2SO_4$ and 108 kg. $H_2O$ are added, yielding 346 kg. of double salt (both the $NH_3$ and the $Na_2SO_4$ may be derived from the 346 kg. of double salt delivered to the solid cycle hereinafter described). The remaining solution is then withdrawn from the dissolver-crystallizer and sufficient $NH_3$ added to the solution at 4 to bring the total $NH_3$ supplied to 34 kg.

For example when no $CO_2$ is absorbed nor desorbed from the solution leaving the bicarbonating tower 3, about 25.0% of the 34 kg. of $NH_3$ may be introduced at 1, while the remainder is added to the solutions at 4. The total supply of $CO_2$ to the solutions is 88 kg. A first part of this amount may be absorbed at absorber 1, a second part is delivered at absorber 4 in order to carbonate as far as possible the $NH_3$ present at this apparatus. The remainder is delivered to the bicarbonating tower yielding 168 kg. of $NaHCO_3$, which, when roasted, yields 106 kg. of $Na_2CO_3$.

When, on the contrary a certain amount of $CO_2$ is desorbed from the solutions after the bicarbonations tower 3, this amount is added to the 88 kg. of $CO_2$ and the total is then absorbed in the group of apparatus 4 and 3″.

The 346 kg. of the double salt precipitated by the dissolver-crystallizer 2 in the liquid cycle is decomposed within a large mass of sodium sulfate in the ammonia generator of the solid cycle, and the reaction yields 72 kg. of water and 34 kg. of $NH_3$, which may be returned to the liquid cycle, together with 240 kg. of $NaHSO_4$, which is led together with the large mass of sodium sulfate, to the HCl generator, where 117 kg. of NaCl is added. The reaction yields 73 kg. of HCl and 284 additional kg. of $Na_2SO_4$, which is supplied to the liquid cycle at 2, while the large mass of $Na_2SO_4$ is returned after heating to the ammonia generator. The process thus yields 73 kg. of HCl as a by-product, plus 168 kg. of $NaHCO_3$, from which the 106 kg. of $Na_2CO_3$ is derived, by roasting.

Figure 8:
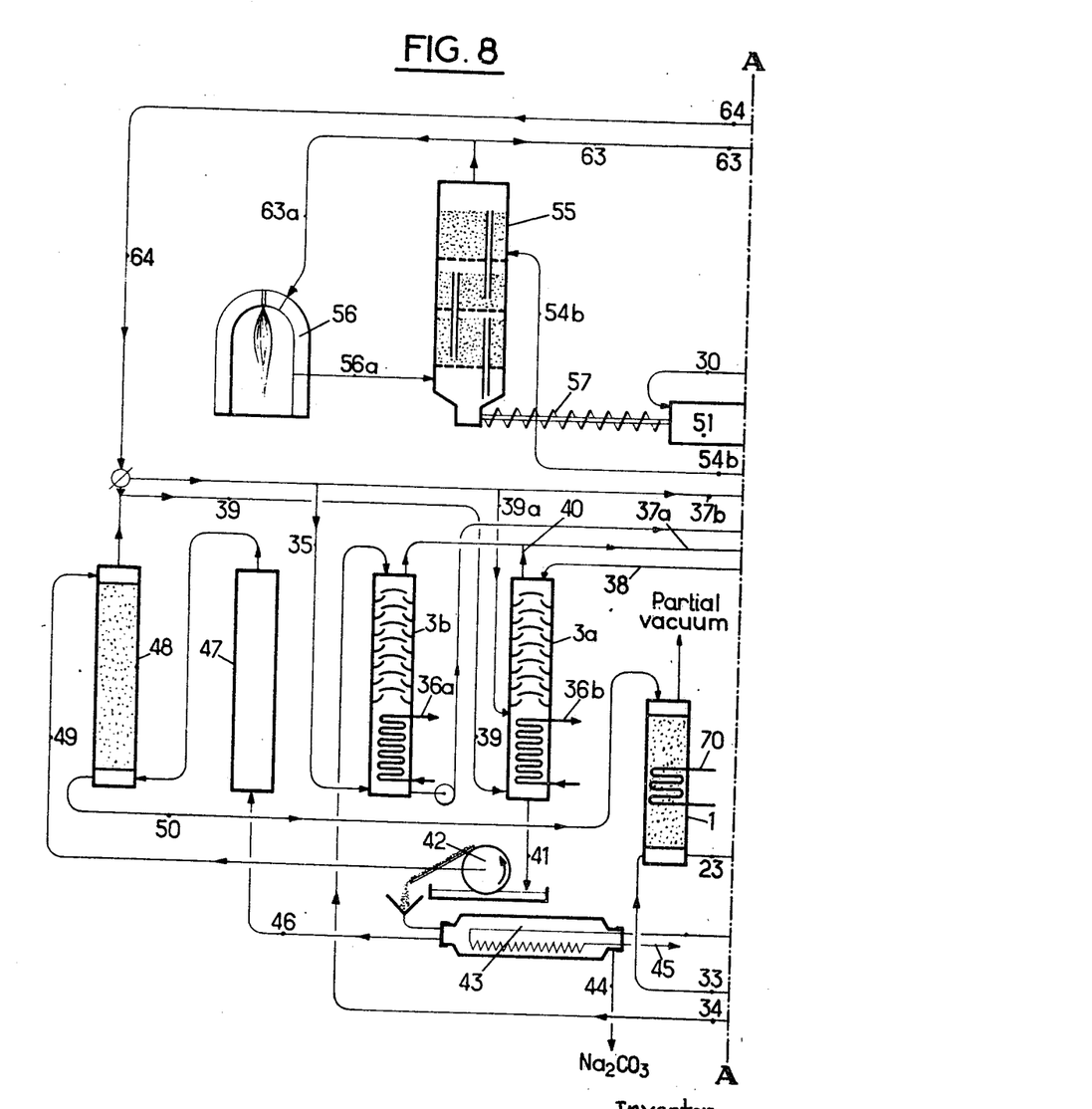
FIG. 8 shows schematically a complete installation for carrying out the process according to the invention.
Figure 8A:
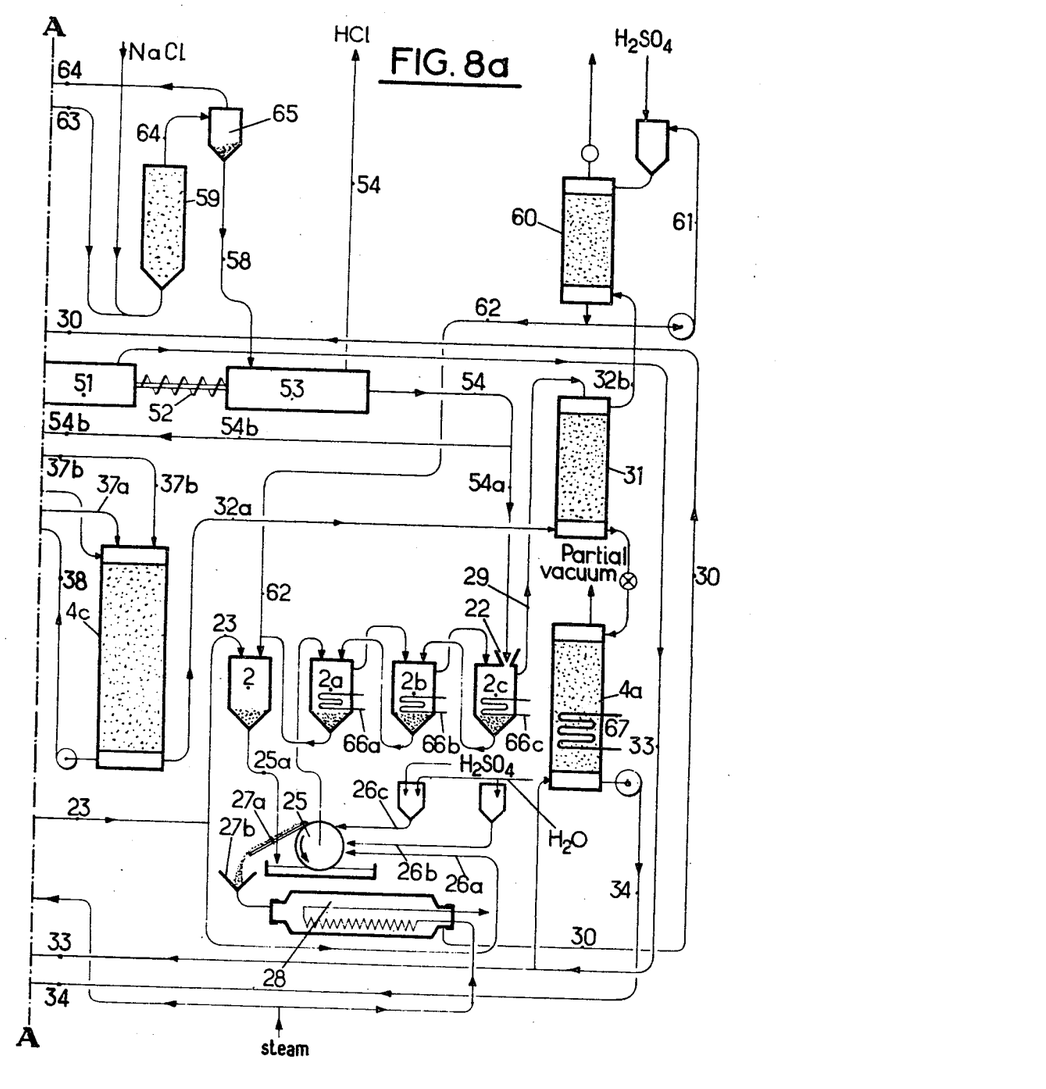

In order to complete the description of the process according to the invention, there will now be briefly described the general outline of an installation for carrying out this process, an installation which is schematically represented on FIG. 8. Referring to FIGURE 8, it will be seen that the installation comprises, as has been hereinbefore indicated, a liquid cycle and a solid cycle.

The liquid cycle utilizes a dissolver-crystallizer 2 supplied with the circulating liquid by means of the pipe 23 and opening into the filter 25 through an outlet 25a. The sodium sulfate is introduced into the dissolver-crystallizer 2 in an indirect manner. It comes in through a succession of dissolving and precipitating counter-current stages comprising the dissolver-crystallizers 2a, 2b, 2c cooled by coils 66a, 66b, 66c. The sodium sulfate is introduced through the supply pipe 22 into the dissolver 2c. The sodium sulfate, which may be mixed with the precipitated double salt, passes from the dissolver 2c to the dissolver 2 through the dissolvers 2a, 2b, while the solutions filtered by the filter 25 pass in counter-current from the dissolver 2a to the dissolver 2c through the pipe 29. The precipitation of the double salt is completed in the dissolver-crystallizer 2.

The filter 25 is a rotating vacuum filter which feeds the double salt dryer 28 through the conveyor means 27a, 27b. This filter comprises a plurality of washing means in which the material is washed by solutions received through the pipe 23 and inlet 26a which have a strong affinity for sodium sulfate, by an influx of water brought in through 26b to displace the ammonia and carbon dioxide, and by a sulfuric acid solution introduced through 26c to neutralize the residual ammonia.

Finally, the dissolver-crystallizer and the associated filter delivers a double salt which is dried and dehydrated in the drying chamber 28, after which it is routed to the solid circuit through the conveyor 30, and a liquid which circulates in the liquid cycle and which is evacuated through the pipe 29. This liquid is led to a washing tower 31 for inert gases, which is supplied with said gases through the pipe 32a, said gases being drawn off through the pipe 32b. The gas drawn off through 32b is routed to a second washing tower 60, the washing liquid in which is a solution of sulfuric acid introduced through the pipe 61 and removed through the pipe 62. The operation of this tower 60 involves a certain amount of recycling. The pipe 62 leads the washing solutions to the dissolver-crystallizer 2.

The circulating liquid then passes through the ammonia absorber 4a, cooled by the coil 67, and supplied with ammonia through the pipe 33. The circulating liquid leaves the absorber 4a through the pipe 34 and then enters the carbonating tower 3b. This tower is identical to the bicarbonating tower 3a but operates as a washer, and is supplied with poor carbon dioxide through the pipe 35.

The circulating liquid is then introduced into a $CO_2$ absorber 4c which is supplied with $CO_2$ through the pipes 37a, 37b, the pipe 37a serving as the outlet for the gas from the washing tower 3b. The pipes 35, 37a and 37b are supplied with gas containing a small percentage of $CO_2$. The circulating liquid is drawn off from the absorber 4c through the pipe 38 and introduced at the top of the bicarbonating tower 3a.

Figure 9:
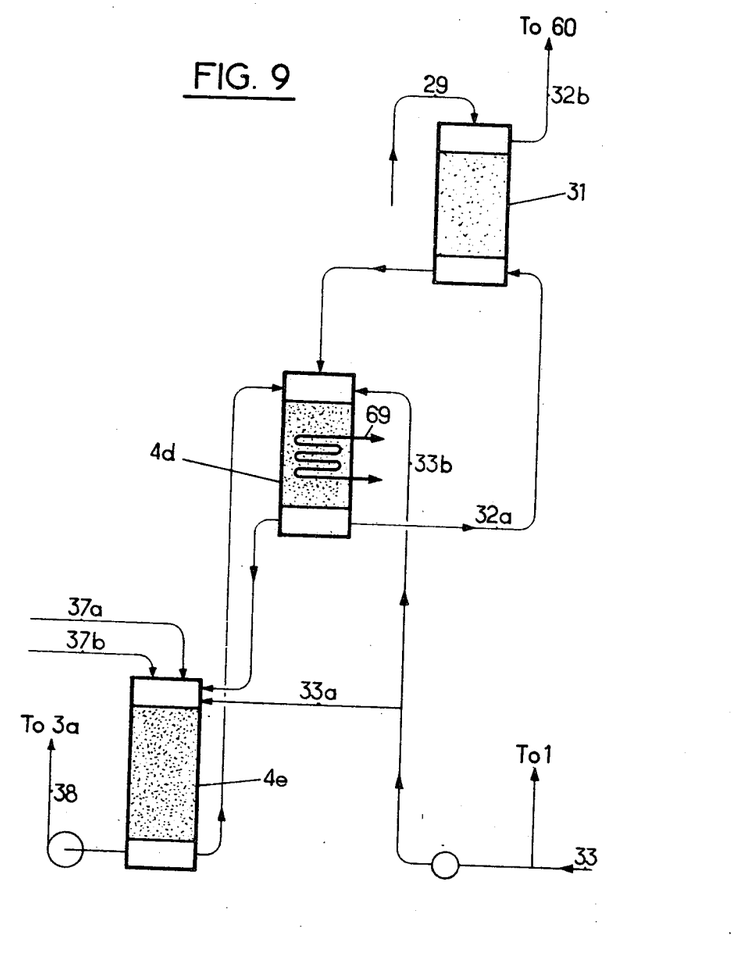
FIG. 9 shows schematically an alternative construction for the ammonia and carbon dioxide absorber in the installation of FIG. 8.

Alternatively, the ammonia and carbon dioxide may be absorbed in the manner illustrated on FIG. 9. On this figure the absorbers 4d and 4e replace the absorbers 4a and 4c shown in FIG. 8, and are connected to the installation of FIG. 8 by the pipes 37a, 37b, 38, 33, 29 and 32b. It should be noted that in the device of FIG. 9 the absorber 4d is provided with a refrigerating coil 69 by means of which the temperature of the circulating liquid may be regulated before it is introduced into the bicarbonating tower 3a. It should also be noted that the pipe 33 which carries the ammonia to the absorbers, is divided into two feeder pipes 33a and 33b, each of which leads to one of the absorbers 4d, 4e.

The tower 3a is provided with a refrigerating coil 36b and supplied with $CO_2$ through the pipe 39. The gas thus supplied has a high $CO_2$ content. An auxiliary carbon dioxide supply pipe 39a is provided through which a gas having a low percentage of $CO_2$ is introduced, and which is connected to pipes 37b and 35. The gas outlet 40 at the top of the bicarbonating tower 3a is connected to the pipe 37a.

The circulating liquid is evacuated from the tower 3a through the pipe 41 which supplies the rotary vacuum filter 42. This filter separates the bicarbonate formed in the tower 3a and it is then routed to the roaster 43, from which the conveyor 44 removes the desired sodium carbonate. The water vapor from the heating coil is removed through the pipe 45 and the gas rich in $CO_2$ through the pipe 46. This gas is led to a cooling coil 47 and thence to a washing tower 48. The outlet from the tower 48 is connected to the pipe 39. The washing tower is supplied through the pipe 49 with solutions filtered by the filter 42. These solutions leave the tower 48 through the pipe 50 and are delivered to the head of an ammonia absorber 1 cooled by the coil 70, and leave this absorber through the pipe 23 which supplies the set of dissolver-crystallizers. The absorber 1 is supplied with gas through the pipe 33. This gas is provided by the ammonia generator of the solid cycle.

The solid cycle comprises an ammonia generator 51 supplied by means of the conveyor 30 with the double salt precipitated in the dissolver-crystallizer of the liquid cycle. The ammonia produced is drawn off through the pipe 33. The mass of sodium sulfate impregnated with sodium acid sulfate is removed from the ammonia generator 51 by a screw conveyor 52, which carries it into the hydrochloric acid generator 53.

The generator 53 is also supplied, with powdered sodium chloride through the pipe 58. This sodium chloride has first been washed, and then dried in a drier 59 which is heated by combustion gases arriving through the pipe 63. These gases leave the drier 59 through the pipe 64, which is equipped with a powder separator 65. The pipe 64 delivers to the pipes 35, 39a, and 37b a gas having a low $CO_2$ content. The hydrochloric acid produced by the generator 53 leaves through the distribution pipe 54. The sodium sulfate is removed from the generator 53 by the conveyor 54.

This sulfate is separated into two parts, the smaller part is delivered at 22 to the dissolver-crystallizer 2c by the conveyor 54a. The larger part is carried by the conveyor 54b into a heater 55 which comprises a fluidized bed. This heater is heated by gaseous combustion products from a burner 56 which consumes residual oil or burns gas. These gaseous combustion products are received by the heater 55 through the pipe 56a and evacuated through the pipe 63. The combustion gases may be recycled through 63a. Hot sodium sulfate is carried from the heater 55 to the ammonia generator 51 by the screw conveyor 57.

This installation operates in the manner already described. In order to provide a specific example of a set of operating conditions which will give satisfactory results, a set of values for the different parameters characteristic of one method of using the installation of FIG. 8 will now be given.

Let it be supposed that the temperature of the solutions circulating in the liquid cycle is about 30° C. at the outlets of the dissolver-crystallizer and the tower 3a, and that the gas having a low $CO_2$ content supplied through the pipe 64 comprises 14% of $CO_2$. The absolute pressure at the top of the bicarbonating tower is fixed at 3.3 kg./cm.$^2$ and let it be supposed that the absolute partial pressure of $CO_2$ at the foot of the tower 3a is 2.1 kg./cm.$^2$ If the volume of liquid circulating in the liquid cycle is 8.1 m.$^3$ per ton of carbonate of soda produced, the following concentrations will prevail in the liquid cycle:

|  | Content in kg./m.³ at outlet from dissolver-crystallizer 2 | Content in kg./m.³ at outlet from the bi-carbonating tower 3 |
| --- | --- | --- |
| $NH_3$ | 39.1 | 25.5 |
| $CO_2$ | 57.2 | 49.5 |
| $(NH_4)_2SO_4$ | 112.3 | 270.9 |
| $Na_2SO_4$ | 298.4 | 127.9 |

In the solid cycle there are about 26 tons of sodium sulfate for each ton of sodium carbonate produced, which serve as heat transfer medium and reaction medium in the generators 51 and 53. The temperature of this mass of sodium sulfate is adjusted to 540° C. at the entrance to the generator 51, 400° C. on the conveyor 52 and 370° C. at the outlet of the generator 53. If it be assumed that the burners burn at about 1800° C., gas at a temperature of 800° C. is supplied to the heater 55. (The drop from the combustion temperature is produced by recycling through 63a.) Under these circumstances the gas evacuated through the pipe 63 is at about 500° C.

If, instead of precipitating the double salt in the first stage of the process, it is preferred to precipitate ammonium sulfate, the following procedure may be adopted.

Figure 10:
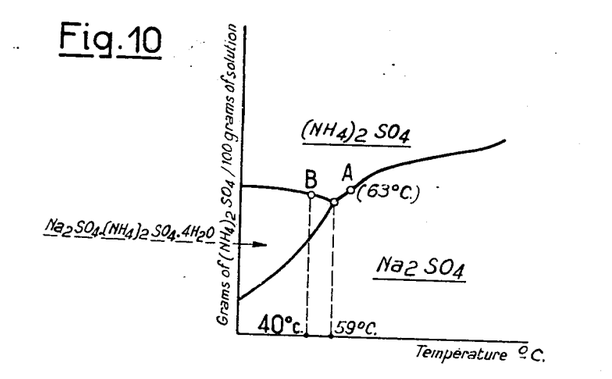
FIG. 10 shows the precipitation curves for a solution containing $SO_4^{--}$, $Na^+$ and $NH_4^+$ ions simultaneously

Referring to FIG. 10, it will be seen that each of the three curves which divide this figure into three parts corresponds to the simultaneous precipitation of two salts.

At any given temperature the point representing a system may be vertically displaced by removing some of the water from the solution. In order to precipitate ammonium sulfate instead of the double salt, it is necessary to operate at a temperature greater than that at the triple point, i.e., about 59° C.

The point A, which corresponds to about 63° C. is suitable, since it is sufficiently distant from the triple point to avoid unwanted precipitation of the double salt without requiring too much heat.

It is clear that at the point A there is simultaneous precipitation of sodium sulfate and ammonium sulfate, but this is in the form of a mixture of the two salts rather than as a double salt.

Figure 11:
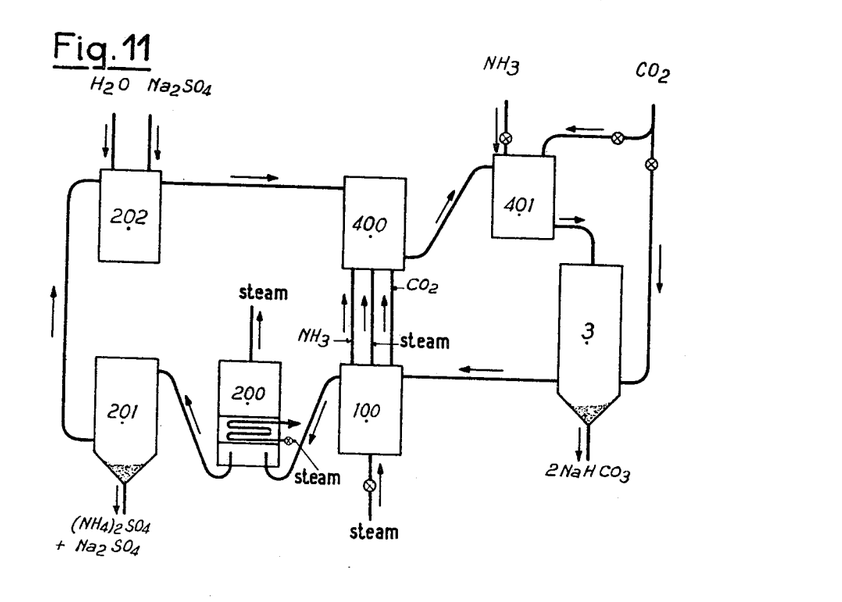
FIG. 11 shows schematically an installation suitable for carrying out the form of the process according to which ammonium sulfate rather than the double salt is precipitated in the first stage.

Turning now to FIGURE 11, which schematically illustrates an installation for use in carrying out the form of the process in which ammonium sulfate is precipitated as $(NH_4)_2SO_4$, reference numeral 3 thereon indicates the bicarbonating tower in which the sodium bicarbonate is precipitated.

Reference numeral 100 indicates a desorber, which may be of the "scrubber" type, using bubbles of steam, and serves a purpose analogous to that of the desorber 1 in FIG. 1. The desorption makes it possible to convey all the free ammonia and carbon dioxide gases from the solutions which flow out of the bicarbonating tower into a device 400 for absorption, as hereinafter described.

After leaving the desorber 100, the solutions enter an evaporator 200 (FIG. 11), which is heated by any suitable means. Ammonium sulfate and sodium sulfate are therein precipitated simultaneously, after evaporation and cooling to 63° C. The magma of the salts is then separated from the solution in a separator 201, after which it progresses through a solid cycle analogous the one previously described.

The solutions are then introduced into a dissolver 202, and sodium sulfate is added to reintroduce the sulfate and sodium ions into the solutions. The sodium ions are for the purpose of precipitating the bicarbonate of soda. Water is also added at this point to replace that removed in the evaporator 200 and provide the molecules thereof necessary to the precipitation of sodium bicarbonate.

The devices 200, 201, 202, as a group, serve a purpose corresponding essentially to that served by the dissolver-crystallizer 2 of FIG. 1.

The solutions are then introduced into an absorber 400 in which the $CO_2$ and ammonia desorbed in the device 100 are reabsorbed. The water removed from the solution in the device 100 is also reintroduced. The solutions then pass to an absorber 401, where a gas having a low $CO_2$ content is absorbed under pressure.

The devices 400 and 401, as a group, serve a purpose corresponding essentially to that served by the absorber 3, FIG. 1. The solutions are then introduced into the bicarbonating tower 3, in which sodium bicarbonate is precipitated.

The conditions prevailing at the outlet of the bicarbonating tower are the same as those at the outlet of the tower of FIG. 8. The temperature to which the material is cooled, after evaporation in the evaporator 200, is above that of the triple point on FIGURE 10. If the material is cooled below this triple point, to 40° C., (Point B on FIG. 10) for example, both ammonium sulfate and the double salt are precipitated simultaneously, but less water need be removed in the evaporator.

The following table shows representative results secured in the process just described at 40° C. and 63° C.

|  | Quantities at 40° C. | Quantities at 63° C. |
| --- | --- | --- |
| Proportion of ammonium sulfate precipitated double salt, percent | 57.4 | 0 |
| Quantity of ammonium sulfate precipitated in double salt per 168 kg. of bicarbonate (kg.) | 75.77 | 0 |
| Quantity of sodium sulfate precipitated at the same time as the ammonium sulfate per 168 kg. of bicarbonate (kg.) | 0 | 66.21 |
| Quantity of sodium sulfate precipitated in the form of the double salt in the device 201 per 168 kg. of bicarbonate (kg.) | 81.51 | 0 |

From the foregoing it will be seen that the process according to the invention may be carried out by precipitating the ammonium sulfate in the form of the double salt, or as $(NH_4)_2SO_4$ simultaneously with sodium sulfate, or by precipitating it simultaneously in the form of ammonium sulfate and in the form of the double salt.

It will of course be appreciated that the foregoing embodiments have been described purely by way of example and may be modified as to detail without thereby departing from the basic principles of the invention.

What is claimed is:

1. The method of making sodium bicarbonate which can be converted to sodium carbonate which comprises the steps of introducing sodium ions into an aqueous ammoniacal carbonate solution by dissolving sodium sulfate therein, precipitating sodium bicarbonate from said solution by absorption of carbon dioxide, thereby forming a solution containing ammonium sulfate as a by-product, precpitating said ammonium sulfate in the form of at least one ammonium salt selected from the group consisting of $(NH_4)_2SO_4$ and $Na_2SO_4(NH_4)_2SO_4 \cdot 4H_2O$ and heating said salt in the presence of a large heat transfer mass of pulverulent sodium sulfate which is at a temperature of 300-800° C. to convert said ammonium salt to $NaHSO_4$ and $NH_3$ and then reacting said $NaHSO_4$ with NaCl to form sodium sulfate and HCl, in which the major portion of said $Na_2SO_4$ in said NaCl reaction mass is recycled to said heat transfer mass and the remainder of said $Na_2SO_4$ is recycled to said aqueous ammoniacal carbonate solution.

2. A process as claimed in claim 1 in which the ammonium sulfate is precipitated in the form of a double salt having the formula $Na_2SO_4,(NH_4)_2SO_4,4H_2O$.

3. The process claimed in claim 1 according to which said last-mentioned sodium sulfate and ammonia are formed at between 300 to 800° C.

4. The process claimed in claim 3 in which said large mass of sodium sulfate is heated in a fluidized bed by contact with combustion gases.

5. The process claimed in claim 1 in which said sodium chloride is washed and dried before it is mixed with said heat transfer mass of sodium bisulfate that contains said $NaHSO_4$.

6. The process claimed in claim 1 according to which the bicarbonate of soda formed in said aqueous ammoniacal solution is precipitated in a bicarbonating tower by introducing thereinto a gas consisting principally of carbon dioxde, which is produced subsequently during the roasting of sodium bicarbonate.

7. The process claimed in claim 1 in which, when forming said ammoniacal carbonate solution, said ammonia is dissolved in the solution before said sodium sulfate is introduced into the solution.

8. The process claimed in claim 1 in which, when forming said ammoniacal carbonate solution, most of said carbon dioxide is dissolved into said solution before said solution reaches the apparatus at which said sodium bicarbonate is precipitated.

9. The process claimed in claim 1 in which, when forming said ammoniacal solution, said carbon dioxide is dissolved in the solution before said sodium sulfate is introduced into the solution.

10. The process claimed in claim 1 in which ammonia is added to the ammonium sulfate formed when said sodium bicarbonate is precipitated, thereby forming an aqueous ammoniacal solution, and said first-mentioned sodium sulfate is added to said aqueous ammoniacal solution to simultaneously assist in the precipitation of said ammonium sulfate in the form of $$NaSO_4,(NH_4)_2SO_4,4H_2O$$

and supply sodium ions for the subsequent precipitation of sodium bicarbonate from the solution remaining after the precipitation of the $NaSO_4,(NH_4)_2SO_4,4H_2O$.

11. The process of claim 10, wherein, after removing said double salt precipitate, $NH_3$ and $CO_2$ gas is added to the remaining solution to precipitate additional sodium bicarbonate.

12. A process as claimed in claim 1, in which the concentrations of sodium sulfate and ammonium sulfate in the solution, from which the ammonium sulfate is precipitated as a salt, are maintained near the triple point, at which said sodium sulfate and sodium bicarbonate coexist with the double salt.

13. The method of claim 1, in which said mass of pulverulent sodium sulfate is at a temperature of 370–400° C.

14. The method of claim 1 in which carbon dioxide gas is separated from the bicarbonate produced and recycled to said ammoniacal solution to precipitate said sodium bicarbonate.

15. The method of claim 1, in which said sodium bicarbonate is roasted to produce sodium carbonate.

16. The method of claim 1, in which said precipitated ammonium sulfate salt is $(NH_4)_2SO_4$.

17. The method of claim 1, in which said precipitated ammonium sulfate salt is $Na_2SO_4(NH_4)_2SO_4 \cdot 4H_2O$.

References Cited

UNITED STATES PATENTS

| 2,843,454 | 7/1958 | Devaux et al. | 23—63 |
| 3,232,701 | 2/1966 | Hansen et al. | 23—63 |

OTHER REFERENCES

Mellov: Comprehensive Treatise on Inorganic and Theoretical Chemistry, vol. 2, 1922, p. 162; vol. 8, 1928, p. 163.

OSCAR R. VERTIZ, Primary Examiner

H. S. MILLER, Assistant Examiner

U.S. Cl. X.R.

23—154, 193, 281